United States Patent
Fausett et al.

(10) Patent No.: US 10,954,860 B2
(45) Date of Patent: Mar. 23, 2021

(54) CERAMIC COATING FOR HEATED FUEL FILTER

(71) Applicant: United Technologies Corporation, Hartford, CT (US)

(72) Inventors: Taylor Fausett, San Diego, CA (US); Patrick M. Wasson, San Ramon, CA (US)

(73) Assignee: Raytheon Technologies Corporation, Waltham, MA (US)

( * ) Notice: Subject to any disclaimer, the term of this patent is extended or adjusted under 35 U.S.C. 154(b) by 0 days.

(21) Appl. No.: 15/024,675

(22) PCT Filed: Dec. 11, 2014

(86) PCT No.: PCT/US2014/069750
§ 371 (c)(1),
(2) Date: Mar. 24, 2016

(87) PCT Pub. No.: WO2015/094903
PCT Pub. Date: Jun. 25, 2015

(65) Prior Publication Data
US 2016/0273455 A1    Sep. 22, 2016

Related U.S. Application Data

(60) Provisional application No. 61/916,638, filed on Dec. 16, 2013.

(51) Int. Cl.
*F02C 7/224* (2006.01)
*B64D 37/34* (2006.01)
(Continued)

(52) U.S. Cl.
CPC .............. *F02C 7/224* (2013.01); *B01D 35/18* (2013.01); *B64D 37/34* (2013.01); *B64D 41/00* (2013.01); *F05D 2220/30* (2013.01)

(58) Field of Classification Search
CPC .... B01D 39/14; B01D 39/20; B01D 39/2068; B01D 2201/313; B01D 35/18; B01D 2325/08; F02C 7/224; B64D 37/34
See application file for complete search history.

(56) References Cited

U.S. PATENT DOCUMENTS 3,083,833 A   4/1963 Kasten
4,073,136 A   2/1978 Symon
(Continued)

FOREIGN PATENT DOCUMENTS

KR   20040030023 A   4/2004
WO   WO9317982 A1    9/1993
WO   WO2007104968 A1 9/2007

OTHER PUBLICATIONS

International Search Report and Written Opinion from PCT Application Serial No. PCT/US2014/069750, dated Mar. 30, 2015, 8 pages.

(Continued)

*Primary Examiner* — Jason M Greene
*Assistant Examiner* — Eric J McCullough
(74) *Attorney, Agent, or Firm* — Kinney & Lange, P.A.

(57) ABSTRACT

A fuel filter comprises a filter screen, a heating element, and a coating. The filter screen includes a first hollow member. The heating element is disposed within the first hollow member. The coating is formed of a thermally conductive, electrically insulating ceramic in a hydrodynamic filtering pattern surrounding the filter screen but having a different shape than a shape of the hollow member.

17 Claims, 4 Drawing Sheets

(51) Int. Cl.
*B01D 35/18* (2006.01)
*B64D 41/00* (2006.01)

(56) References Cited

U.S. PATENT DOCUMENTS

| | | | |
|---|---|---|---|
| 4,486,558 A | 12/1984 | Guilbert | |
| 5,069,726 A | 12/1991 | Ragless | |
| 5,393,327 A * | 2/1995 | Chambers | B01D 46/0067 55/302 |
| 5,636,434 A | 6/1997 | Okey et al. | |
| 5,638,960 A * | 6/1997 | Beuermann | B01D 29/356 209/397 |
| 5,766,740 A | 6/1998 | Olson | |
| 5,798,171 A | 8/1998 | Olson | |
| 6,531,100 B1 * | 3/2003 | Ogata | B01J 35/002 422/177 |
| 2002/0141910 A1 * | 10/2002 | Adiletta | B01D 46/0024 422/171 |
| 2003/0215372 A1 * | 11/2003 | Ose | B01D 46/0024 422/174 |
| 2006/0053760 A1 | 3/2006 | Kong | |
| 2008/0148700 A1 * | 6/2008 | Ziebarth | B01D 46/2429 55/523 |
| 2008/0197064 A1 | 8/2008 | Blasco Remacha et al. | |
| 2008/0250792 A1 | 10/2008 | Wang et al. | |
| 2008/0274020 A1 * | 11/2008 | Matsuoka | B01D 39/086 422/180 |
| 2012/0000363 A1 * | 1/2012 | Mizutani | B01D 63/082 96/9 |
| 2013/0069478 A1 | 3/2013 | Hamer | |

OTHER PUBLICATIONS

Extended European Search Report for EP Application No. 14870794.6, dated Dec. 2, 2016, 6 pages.

* cited by examiner

CERAMIC COATING FOR HEATED FUEL FILTER

BACKGROUND

The present invention relates generally to fluid filtration, and more specifically to heated ice filter for aircraft gas turbine engine fuel systems.

Aircraft fuel systems operate in a wide range of environmental conditions, including temperatures which can range from −55° C. (−67° F.) to 200° C. (392° F.).

At lower temperatures, such systems may be susceptible to ice clogging. In rare instances, ice may lodge in servo valves or other calibrated fuel system components.

Conventional aircraft fuel system filters are capable of limited ice management. Filters with sufficiently narrow apertures to prevent ingress of small ice debris cause a large fluid pressure drop, while filters with less impact on fluid pressure tend to be too coarse to catch small debris based purely on filter geometry.

Icing can be an issue for all aircraft gas turbine engines, but tends to be particularly acute for auxiliary power units (APUs). Aircraft APUs typically spend much of each flight at rest, with no fuel flow, and may gather ice in this resting state. When APU power is needed, the APU may be suddenly required to operate in a freezing condition, despite any accumulated ice.

SUMMARY

The present invention relates to a fuel filter comprising a filter screen, a heating element, and a coating. The filter screen includes a first hollow member. The heating element is disposed within the first hollow member. The coating is formed of a thermally conductive, electrically insulating ceramic in a hydrodynamic filtering pattern surrounding the filter screen but having a different shape than a shape of the hollow member.

DETAILED DESCRIPTION

Figure 1:
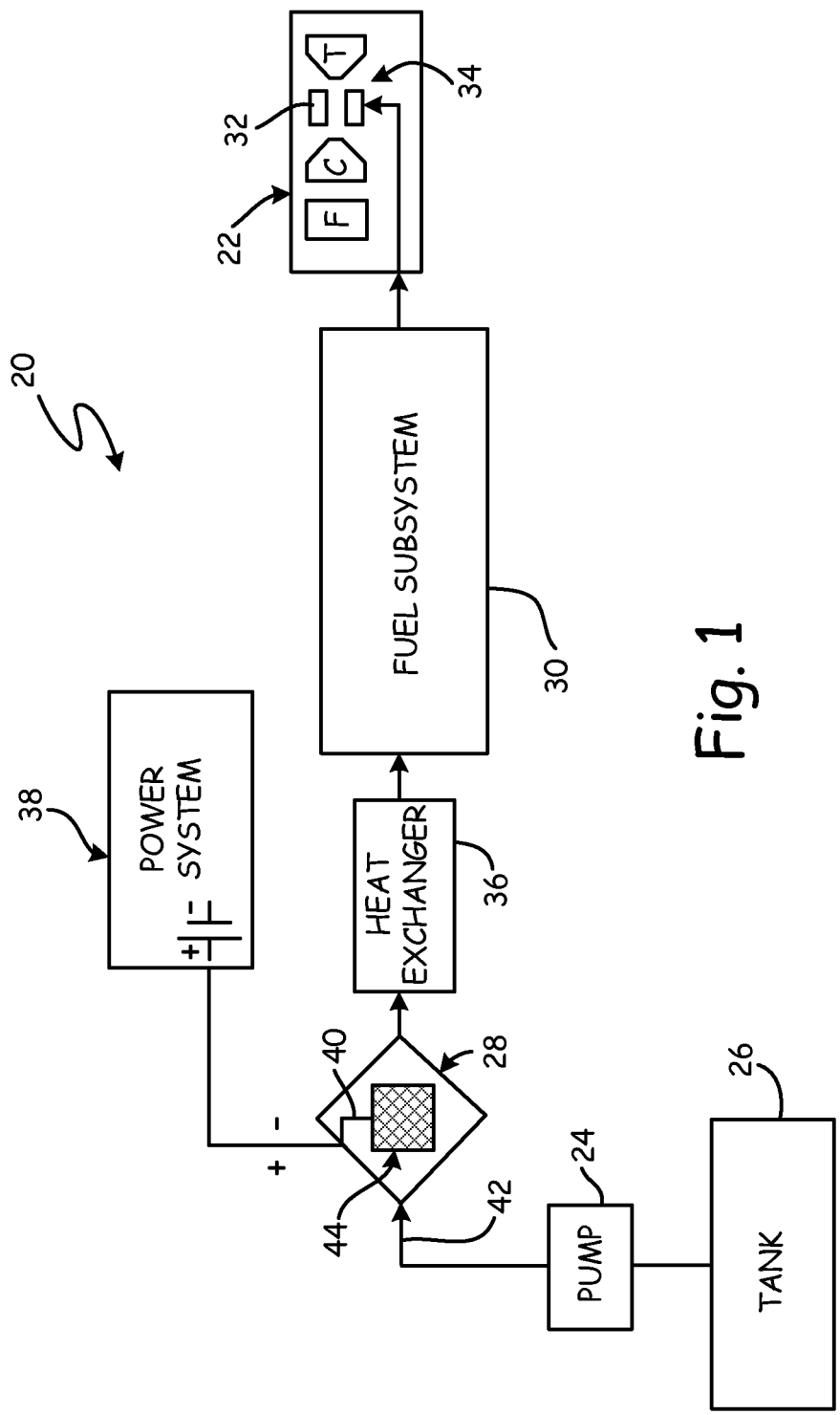
FIG. 1 is a schematic diagram of an embodiment of a fuel system for a gas turbine engine.

FIG. 1 is a schematic diagram of fuel system 20 for gas turbine engine 22. Gas turbine engine 22 can, for example, be an aircraft auxiliary power unit (APU). In alternative embodiments, gas turbine engine 22 may be an aircraft primary thrust engine or an industrial power turbine. Gas turbine engine 22 comprises one or more combustors 32 with fuel manifold 34, as well as fan F, compressor C, and turbine T. Fuel system 20 comprises pump 24, tank 26, filter 28, fuel subsystem 30, heat exchanger 36, and power system 38.

Pump 24 is a high pressure pump that draws fuel from tank 26, a storage reservoir that holds fuel for gas turbine engine 22. Pump 24 forces fuel through fuel conduit 42, and sequentially to filter 28, heat exchanger 36, and fuel subsystem 30. Fuel manifold 34 supplies fuel to combustor 32 from fuel subsystem 30. Fuel subsystem 30 is an actuated fuel flow control system which may for instance include fuel modules, pumps, valves, and filters to regulate fuel pressure and flow.

Fuel from tank 26 can reach low temperatures not conducive to operation of gas turbine engine 22. In aircraft applications, for instance, environment temperatures may routinely range from −55° C. (−67° F.) to 200° C. (392° F.). These temperatures can cause icing of fuel within tank 26, and can reduce the operating efficiency of gas turbine engine 22. Heat exchanger 36 preheats fuel from tank 26 to improve engine efficiency, and, according to an embodiment, may be, for instance, a fluid-to-fluid tortuous path heat exchanger.

In an embodiment, filter 28 is a resistively heated de-icing or ice control filter disposed between pump 24 and fuel subsystem 30. Although filter 28 is shown situated immediately downstream of heat exchanger 36, filer 28 may alternatively be situated upstream of heat exchanger 36. Filter 28 includes filter screen 44, and draws power from power system 38 via power connection 40 to provide resistive heating. Power system 38 may, for instance, be a generator, battery, or other source of power or heat. Filter 28 is described in further detail below with respect to FIGS. 2-4B.

Figure 2:
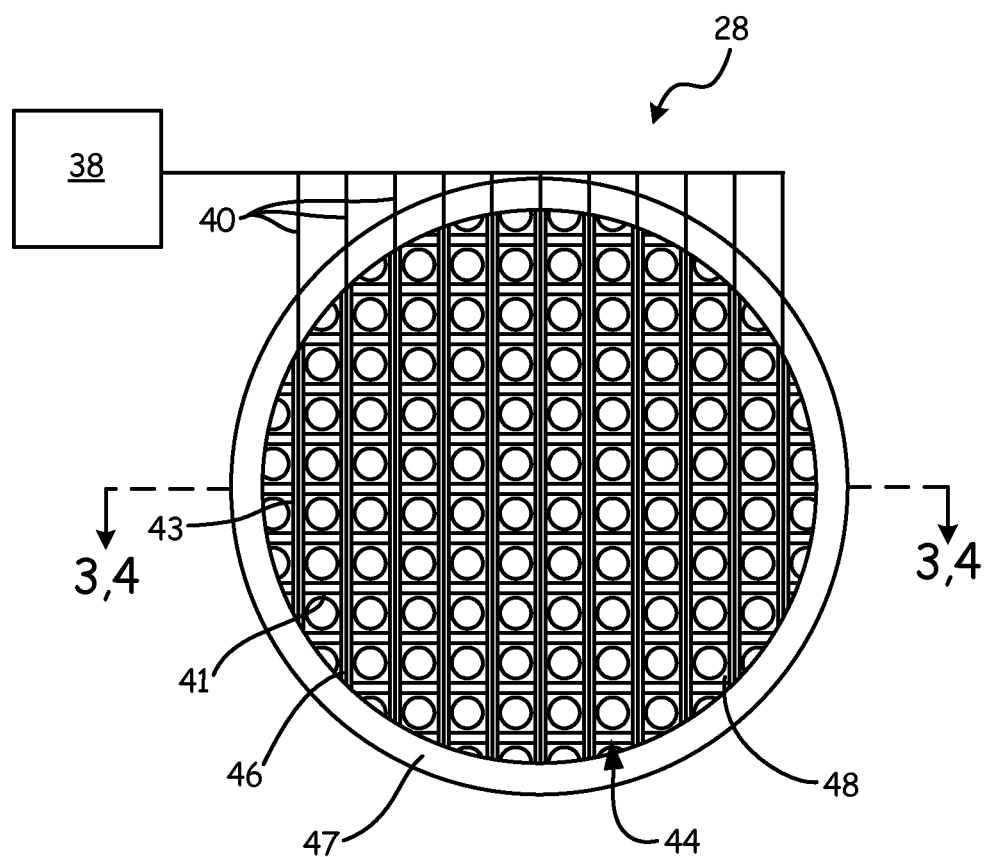
FIG. 2 is a schematic diagram of an embodiment of a filter of a fuel system.

FIG. 2 is a schematic view of an embodiment of filter 28, illustrating power system 38, power connection 40, filter screen 44 (with solid members 41 and hollow members 43), resistive elements 46, and wall 47. Although filter screen 44 is shown in solid lines, it is surrounded entirely by coating 48. FIG. 2 further illustrates section line 3,4-3,4, through which the sectional views of FIGS. 3A, 3B, 4A, and 4B are taken.

As described above with respect to FIG. 1, power system 38 acts as a power source for resistive heating of filter 28. Filter 28 is disposed within a channel defined by wall 47. Although wall 47 is depicted as circular (e.g. for a cylindrical fuel line), wall 47 may have any shape suited to a fuel conduit 42 within which filter 28 is situated. Filter screen 44 extends across the full extent of the space defined by wall 47, and comprises at least one hollow member 43. Hollow member 43 carries resistive element 46, which draws power from power system 38 via power connection 40 to heat filter screen 44. Resistive element 46 is an electrically resistive heater.

In the depicted embodiment, all vertical sections of filter screen 44 are hollow members 43 carrying resistive elements 46, while all horizontal sections of filter screen 44 are solid members 41. More generally, however, any configuration of hollow and solid members, or of exclusively hollow members, may be used. Solid members 41 can provide greater structural strength to filter screen, while hollow members 43 carry resistive elements 46 to heat filter screen 44, and thereby filter 28. In some embodiments, resistive elements 46 may be distributed substantially evenly across filter screen 44, for more even heating.

Filter screen 44 is a mesh formed of a material with high thermal conductivity, such as copper or tungsten. Filter screen 44 catches ice debris from tank 26, thereby preventing components of fuel subsystem 30 from clogging or fouling. In one embodiment, filter screen 44 has a mesh dimension (e.g. a distance between adjacent parallel mesh elements) less than 1400 microns. In other embodiments, any larger or smaller mesh dimensions may be used. Although filter screen 44 is depicted as a rectangular or square mesh, other patterns (hexagonal, diamond, etc.) can equivalently be used.

Filter screen 44 is covered with coating 48, which is described in more detail below with respect to FIGS. 3A, 3B, 4A, and 4B. Coating 48 is formed of an electrically insulating, thermally conductive ceramic material such as Beryllia (Beryllium Oxide), Alumina (Aluminum Oxide), and Aluminum Nitride, or combinations thereof. Coating 48 may, for instance, be deposited atop filter screen 44, or may be formed via a thick-film deposition process whereby filter screen 44 is formed within coating 48, and filter screen 44 and coating 48 are cured together. Filter screen 44 and coating 48 have substantially the same coefficient of thermal expansion (e.g. the same as copper for a copper screen, or as tungsten for a tungsten screen) at least within ordinary operating temperature ranges from −55° C. (−67° F.) to 200° C. (392° F.).

Coating 48 prevents electrical discharges that might otherwise prove hazardous in the volatile, fuel-carrying environment of filter 28. Because coating 48 is electrically insulating but thermally conductive, resistive elements 46 are able to heat fuel and melt ice within wall 47, thereby preventing ice accumulation and clogging or obstruction of filter 28 due to ice debris buildup. Moreover, coating 48 forms a hydrodynamic filtering pattern that surrounds mesh screen 44, but has a different shape. Coating 48 forms a series of bellmouth apertures, as described below with respect to FIGS. 3A, 3B, 4A, and 4B, so as to cause minimal pressure drop across filter 28.

Figure 3A:
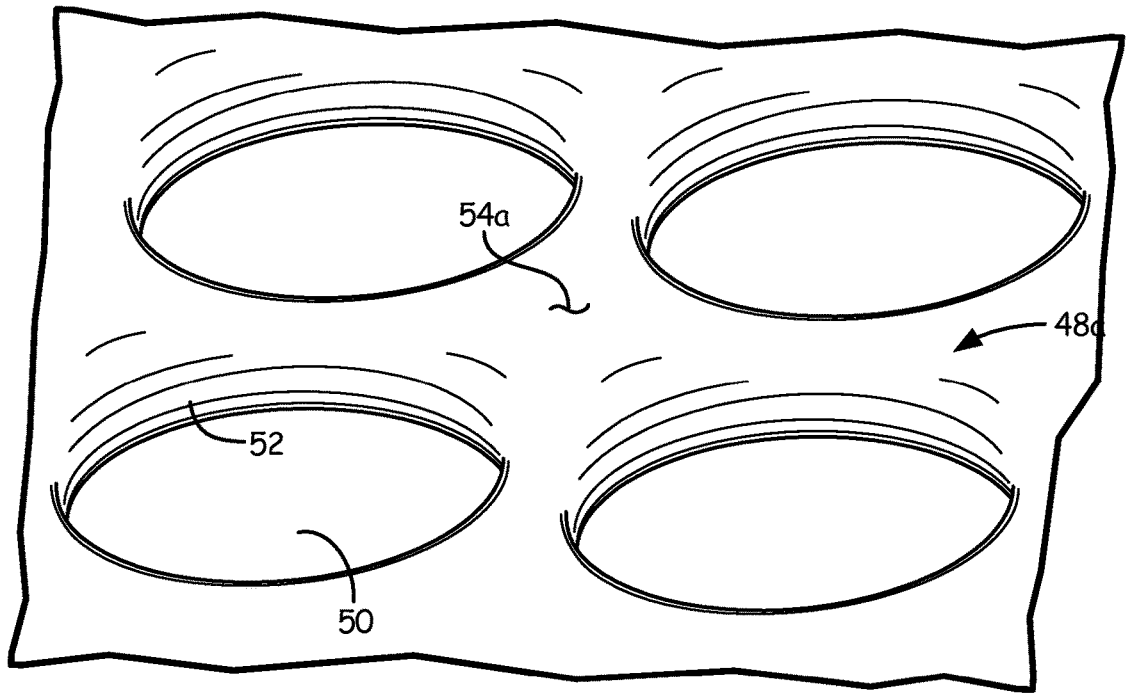
FIG. 3A is a perspective view of an embodiment of the filter of FIG. 2.
Figure 3B:
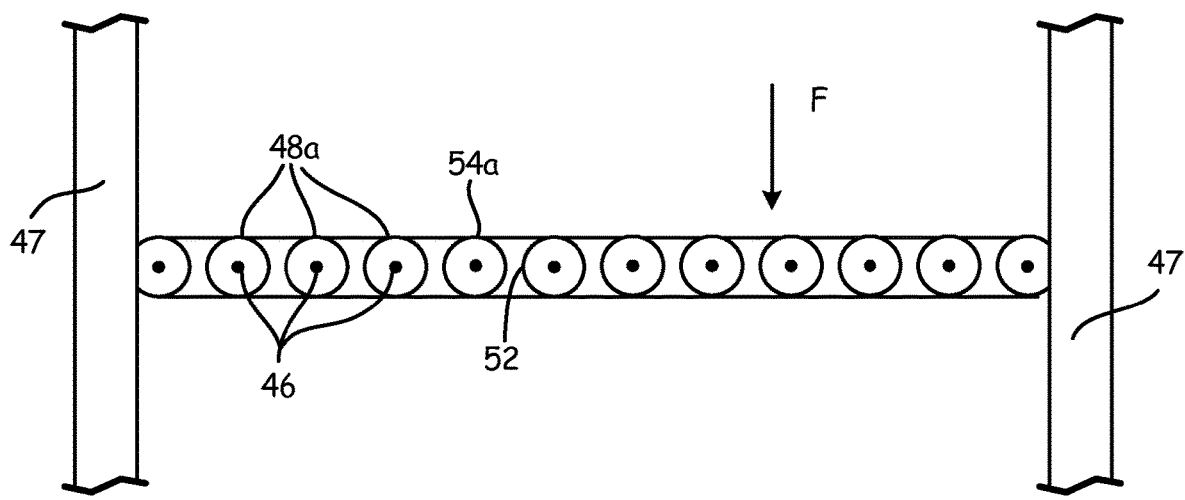
FIG. 3B is a cross-sectional view of a portion of the filter of FIG. 3A, taken along line 3,4-3,4 of FIG. 2.

FIGS. 3A and 3B are perspective and cross-sectional views, respectively, of a first embodiment of filter 28. No hatching is provided for simplicity and clarity. FIG. 3B is taken along sectional lines 3,4-3,4 of FIG. 2. FIGS. 3A and 3B illustrate coating 48*a*, one possible shape for coating 48. As depicted in FIGS. 3A and 3B, coating 48*a* surrounds resistive elements 46, and forms a plurality of apertures 50 with substantially smoothly curved boundaries. Apertures 50 have minimum diameter locations 52 located at or near the natural vena contracta of fluid flow (see flow arrow F) through apertures 50. As a result, pressure drop across filter 28 is reduced. Coating 48*a* has a substantially flat and/or uncontoured shape 54A except surrounding apertures 50.

Figure 4A:
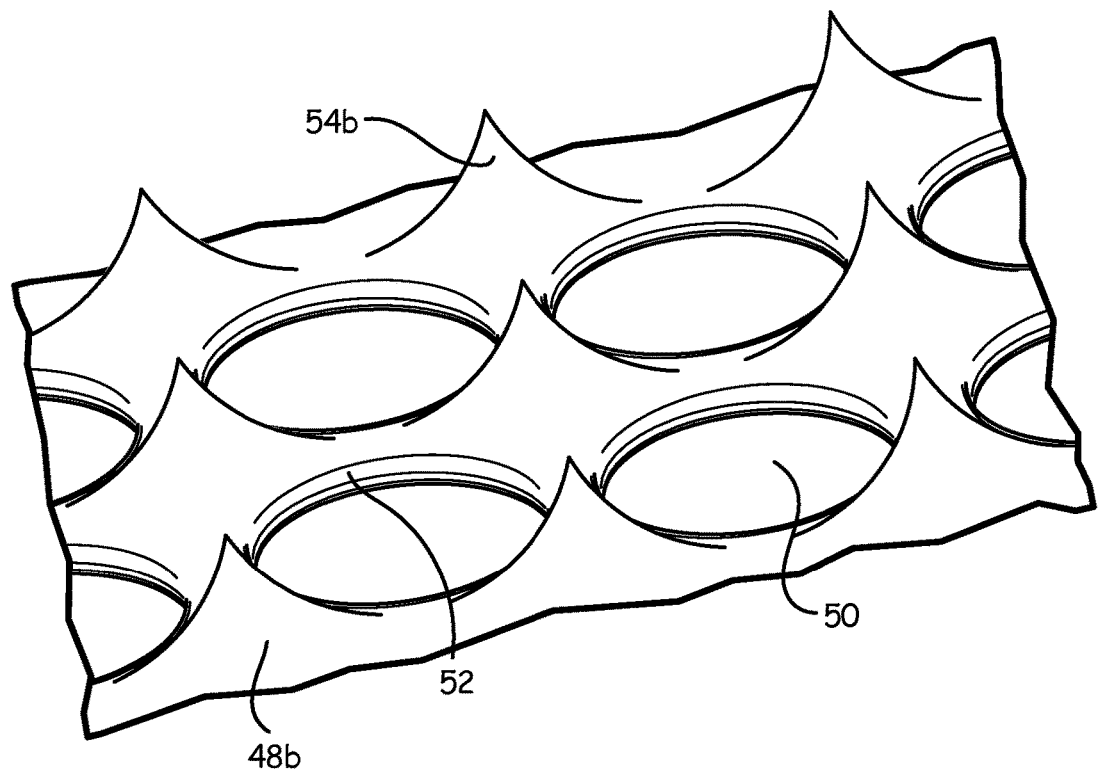
FIG. 4A is a perspective view of an additional embodiment of the filter of FIG. 2.
Figure 4B:
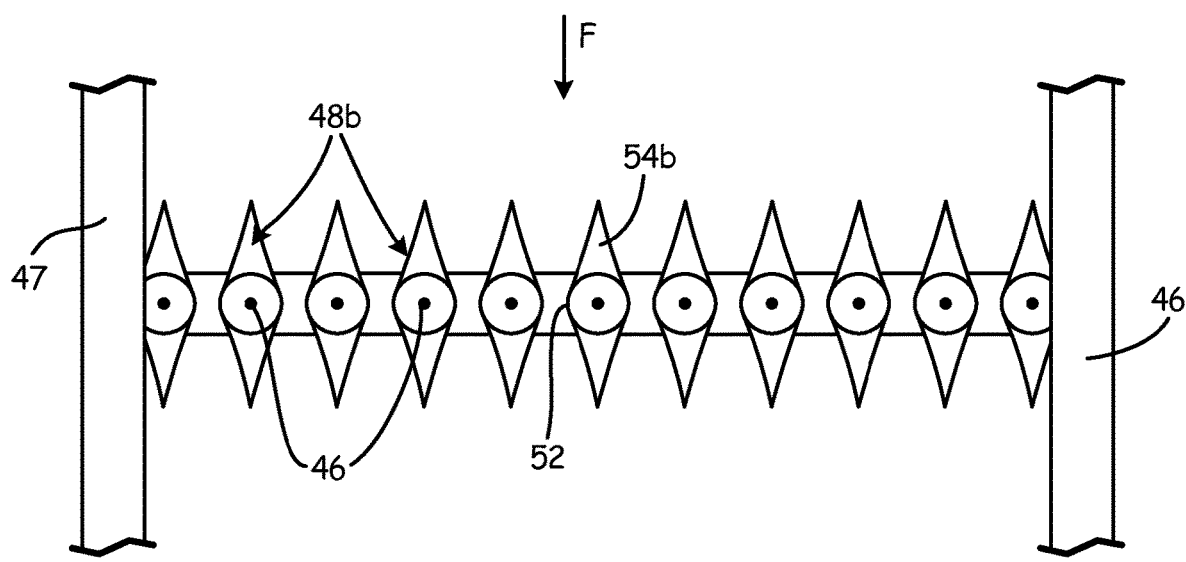
FIG. 4B is a cross-sectional view of a portion of the filter of FIG. 4A, taken along line 3,4-3,4 of FIG. 2.

FIGS. 4A and 4B are perspective and cross-sectional views, respectively, of a second embodiment of filter 28. FIG. 4B is taken along sectional lines 3,4-3,4 of FIG. 2. FIGS. 4A and 4B illustrate a second possible shape 48*b* for coating 48. Like coating 48*a*, coating 48*b* surrounds resistive elements 46 and forms a plurality of apertures 50 with substantially smoothly curved boundaries, each having a minimum diameter location 52 located at or near the natural vena contracta of fluid flow (see flow arrow F) through the corresponding aperture 50. Unlike coating 48*a*, coating 48*b* has sharp guide points 54B that serve to guide fluid flow away from intersections of filter screen 44, and towards apertures 50. Guide points 54B extend at least in an upstream direction, away from the plane of filter screen 44, and may extend in a downstream direction as well.

Coating 48 (including the embodiments of coating 48*a* and coating 48*b*) prevents electrical discharges within fuel lines, conducts heat from resistive elements 46 to melt ice, and optimizes fluid flow through apertures 50 to minimize pressure drop across filter 28.

Discussion of Possible Embodiments

The following are non-exclusive descriptions of possible embodiments of the present invention.

A fuel filter comprising: a filter screen including a first hollow member; a heating element disposed within the first hollow member; and a coating formed of a thermally conductive, electrically insulating ceramic in a hydrodynamic filtering pattern surrounding the filter screen but having a different shape than a shape of the hollow member.

The fuel filter of the preceding paragraph can optionally include, additionally and/or alternatively, any one or more of the following features, configurations and/or additional components:

A further embodiment of the foregoing fuel filter, wherein the heating element is an electrically resistive heater.

A further embodiment of the foregoing fuel filter, wherein the filter screen has a mesh dimension of less than 1400 microns.

A further embodiment of the foregoing fuel filter, wherein the filter screen is formed of a first material with a first coefficient of thermal expansion, and the coating is formed of a second material with a second coefficient of thermal expansion that is substantially similar to the first coefficient of thermal expansion.

A further embodiment of the foregoing fuel filter, wherein the hydrodynamic filtering pattern includes a plurality of bellmouth apertures.

A further embodiment of the foregoing fuel filter, wherein each of the bellmouth apertures has a minimum aperture diameter at or near a vena contracta of fluid flow through the bellmouth aperture.

A further embodiment of the foregoing fuel filter, wherein the filtering pattern includes guide points projecting upstream into the fluid at intersections of the filter screen.

A further embodiment of the foregoing fuel filter, wherein the filtering pattern is formed via a thick film deposition process whereby the filter screen is deposited inside the coating, and the filter screen and coating are cured simultaneously.

A further embodiment of the foregoing fuel filter, wherein the filter screen comprises at least one of copper and tungsten.

A further embodiment of the foregoing fuel filter, wherein the coating is a ceramic formed of Beryllia (Beryllium Oxide), Alumina (Aluminum Oxide), Aluminum Nitride, or combinations thereof, with substantially the same coefficient of thermal expansion as copper between −55° C. (−67° F.) and 200° C. (392° F.).

A further embodiment of the foregoing fuel filter, wherein the coating is a ceramic formed of Beryllia (Beryllium Oxide), Alumina (Aluminum Oxide), Aluminum Nitride, or combinations thereof, with substantially the same coefficient of thermal expansion as tungsten between −55° C. (−67° F.) and 200° C. (392° F.).

A fuel system for a gas turbine engine, the fuel system comprising: a pump configured to draw fuel from a fuel tank; a fluid line configured to carry fuel from the pump to a combustor of the gas turbine engine; a fuel filter disposed on the fluid line, and comprising: an electrically resistively heated filter screen; and a coating formed of a thermally conductive, electrically insulating ceramic in a hydrodynamic filtering pattern surrounding at least a portion of the heated filter screen.

The fuel system of the preceding paragraph can optionally include, additionally and/or alternatively, any one or more of the following features, configurations and/or additional components:

A further embodiment of the foregoing fuel system, wherein the hydrodynamic filtering pattern has a different shape than a shape of the resistively heated filter screen.

A further embodiment of the foregoing fuel system, the resistively heated filter screen defines a grid, and the hydrodynamic filtering pattern includes a plurality of bellmouth apertures situated at openings of the grid.

A further embodiment of the foregoing fuel system, the hydrodynamic filtering pattern further comprises guide points projecting in an upstream direction into the fuel at intersections of the grid.

A method for filtering fuel in a gas turbine engine fuel system, the method comprising: defining a fluid flow path through a filter screen with at least one electrically resistive heating element, the filter screen comprising: a mesh formed of a plurality of filter elements within the gas turbine engine fuel system, such that the filter screen forms openings having a first perimeter with a substantially rectangular shape, the at least one electrically resistive heating element disposed within at least one of the plurality of filter elements; a thermally conductive, electrically insulating ceramic coating on the mesh, such that the openings have a second perimeter that includes at least one curved portion; and heating the fluid flow path by running current through the electrically resistive element.

A further embodiment of the foregoing method, wherein the filter screen and the thermally conductive, electrically insulating ceramic coating are formed of materials with substantially identical coefficients of thermal expansion.

A further embodiment of the foregoing method, wherein the filter screen comprises at least one of copper and tungsten.

A further embodiment of the foregoing method, wherein the thermally conductive, electrically insulating ceramic coating forms a bellmouth aperture at each of the openings.

A further embodiment of the foregoing method, wherein each of the bellmouth apertures has a minimum aperture diameter at or near a vena contracta of fluid flow through the bellmouth aperture.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel filter comprising:
a filter screen including a first hollow member;
a heating element disposed within the first hollow member; and
a coating formed of a thermally conductive, electrically insulating ceramic in a filtering pattern not exhibited by the filter screen, the filtering pattern both surrounding the filter screen and extending away from the filter screen to form a coated shape having a plurality of curved bellmouth apertures not present in the filter screen,
wherein the filtering pattern includes projections at intersections of the filter screen, the projections extending in an upstream direction to form acute guide points.

2. The fuel filter of claim 1, wherein the heating element is an electrically resistive heater.

3. The fuel filter of claim 1, wherein the filter screen has a mesh dimension of less than 1400 microns.

4. The fuel filter of claim 1, wherein the filter screen is formed of a first material with a first coefficient of thermal expansion, and the coating is formed of a second material with a second coefficient of thermal expansion, the second coefficient of thermal expansion being substantially equal to the first coefficient of thermal expansion.

5. The fuel filter of claim 1, wherein each of the bellmouth apertures has a minimum aperture diameter at or near a vena contracta of fluid flow through the bellmouth aperture.

6. The fuel filter of claim 1, wherein the filtering pattern is formed via a thick film deposition process whereby the filter screen is deposited inside the coating, and the filter screen and coating are cured simultaneously.

7. The fuel filter of claim 1, wherein the filter screen comprises at least one of copper and tungsten.

8. The fuel filter of claim 7, wherein the coating is a ceramic formed of Beryllia (Beryllium Oxide), Alumina (Aluminum Oxide), Aluminum Nitride, or combinations thereof, with substantially the same coefficient of thermal expansion as copper between −55° C. (−67° F.) and 200° C. (392° F.).

9. The fuel filter of claim 7, wherein the coating is a ceramic formed of Beryllia (Beryllium Oxide), Alumina (Aluminum Oxide), Aluminum Nitride, or combinations thereof, with substantially the same coefficient of thermal expansion as tungsten between −55° C. (−67° F.) and 200° C. (392° F.).

10. A fuel system for a gas turbine engine, the fuel system comprising:
a pump configured to draw fuel from a fuel tank;
a fluid line configured to carry fuel from the pump to a combustor of the gas turbine engine; and
the fuel filter of claim 1.

11. The fuel system of claim 10, wherein the resistively heated filter screen defines a grid, and the bellmouth apertures are situated at openings of the grid.

12. A method for filtering fuel in a gas turbine engine fuel system, the method comprising:
moving a fluid through a fuel filter, the fuel filter comprising:
a mesh formed of a plurality of filter elements within the gas turbine engine fuel system, such that the mesh forms openings having a first perimeter with a substantially rectangular shape, the at least one electrically resistive heating element disposed within a member among the plurality of filter elements;
a thermally conductive, electrically insulating ceramic coating that both surrounds the mesh and extends away from the mesh in a filtering pattern not exhibited by the mesh to form a coated shape having a plurality of curved bellmouth apertures not present in the mesh, such that the openings, when coated, have a second perimeter that includes at least one curved portion, wherein the filtering pattern includes projections at intersections of the filter screen, the projections extending in an upstream direction to form acute guide points; and
heating the fluid by running current through the electrically resistive heating element.

13. The method of claim 12, wherein the mesh and the thermally conductive, electrically insulating ceramic coating are formed of materials with substantially identical coefficients of thermal expansion.

14. The method of claim 13, wherein the mesh comprises at least one of copper and tungsten.

15. The method of claim 12, wherein each of the bellmouth apertures has a minimum aperture diameter at or near a vena contracta of fluid flow through the bellmouth aperture.

16. The fuel filter of claim 1, wherein the filter screen is a mesh filter screen including a plurality of openings defined therein, the openings respectively having a polygonal shape.

17. The fuel filter of claim 16, wherein the polygonal shape is a square or rectangular shape.

\* \* \* \* \*